Jan. 14, 1941.                W. L. MORRISON                2,228,283
                        AUTOMOBILE VENTILATING DEVICE
                            Filed Feb. 25, 1938
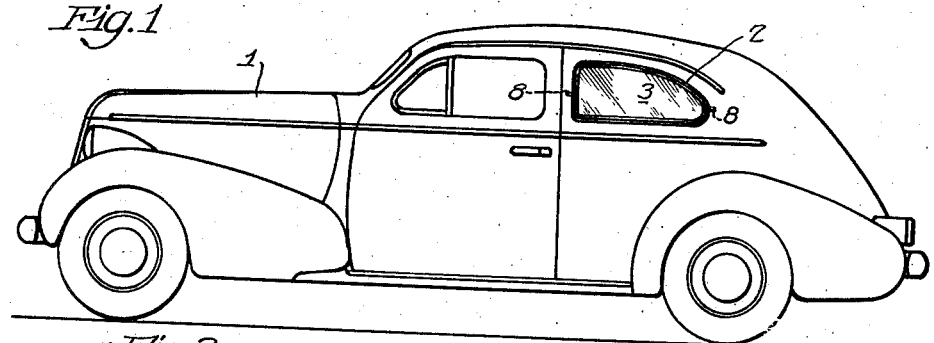
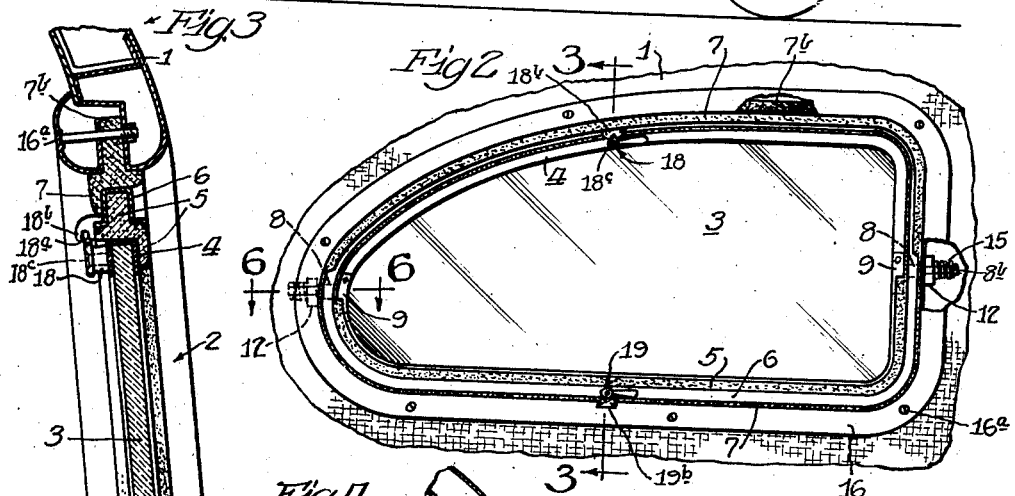
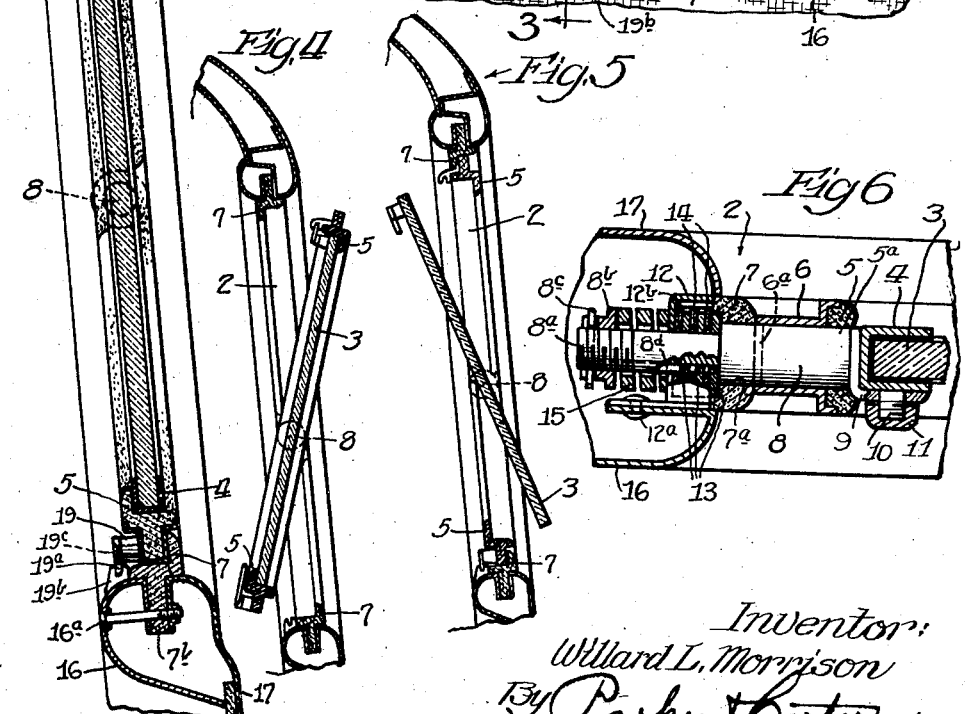
Inventor:
Willard L. Morrison
By Parker & Carter attys.

Patented Jan. 14, 1941

2,228,283

UNITED STATES PATENT OFFICE 2,228,283

AUTOMOBILE VENTILATING DEVICE

Willard L. Morrison, Lake Forest, Ill.

Application February 25, 1938, Serial No. 192,607

4 Claims. (Cl. 296—44)

This invention relates to automobile ventilating devices and has for its object to provide a new and improved device of this description. The invention has as a further object to provide a device of this description which can be used in rainy weather and which in addition to letting air into the automobile, will keep out the rain. The invention has further objects which are more particularly pointed out in the accompanying description.

Referring now to the drawing,

Fig. 1 is a side view showing an automobile embodying one form of the ventilating device;

Fig. 2 is an enlarged view of the window and frame separate from the automobile as seen from within;

Fig. 3 is an enlarged sectional view taken on line 3—3 of Fig. 2;

Fig. 4 is a view showing the window and frame in one of its ventilating positions;

Fig. 5 is a view showing the window in a ventilating position and also in position to exclude rain from the automobile; and Fig. 6 is an enlarged sectional view taken on line 6—6 of Fig. 2.

Like numerals refer to like parts throughout the several figures.

Referring now to the drawing, I have illustrated a two door automobile having a body 1, but it is evident that my invention may be used in connection with any other form of automobile. I have illustrated the invention in connection, for example, with the rear window of the automobile. In the two door automobile, the rear window is much longer ordinarily than in a four door automobile. With such a long window if an attempt is made to pivot it on vertical pivots, certain difficulties are presented and it is impractical to have it move on vertical pivots as in that event it would project too far outside of the automobile and too far inside of the automobile. With the present arrangement, these difficulties are removed and the automobile can be ventilated without rain entering. It is of course evident that this window may be used with any of the other windows of automobiles.

Referring now to the rear window construction, there is illustrated a window opening 2 having a window glass 3. This window glass may be provided with a metal frame member 4 on the edge thereof. There is a sealing device 5 for sealing this window glass when it is closed. There is an outer frame 6 in which the glass 3 is pivotally mounted. The frame 6 is pivotally mounted in the window opening and there is a seal 7 attached to the portion of the automobile around the window opening, for sealing the frame 6. This sealing device as herein shown has a part 7b which projects into a slot in the window frame and which is held in position by the fastening devices 16a.

The frame and the window glass may be pivotally mounted by separate pivots if desired. I have, however, illustrated a construction where the same pivots act for the glass and for the frame. In this construction I have shown pivots 8, one at each end, and which extend longitudinally of the automobile. These pivots project through openings 5a in the sealing device 5 and openings 6a in the frame 6 and openings 7a in the sealing device 7 and are connected by the connecting member 9 with the window glass 3, as by being connected to the frame member 4 by means of the threaded pin 10 which passes through the connecting member 9, the parts being held in place by the nut 11. The pivots project through the frame member 6.

Some means is provided for maintaining the window glass or the frame or both the window glass and the frame in any of their angular positions. I have shown one means for doing this which consists in making one or both of the pivots friction pivots. In this construction the pivots 8 project through the stationary window frame 17 into a hollow space formed in the window frame and there is a friction member 12 in the space inside of the window frame which may be fastened in position so as to be stationary, as by means of the fastening device 12a. This friction member is provided with the friction portion 12b.

The pivot 8 is preferably reduced in diameter at its end so as to be provided with a shoulder. There are a series of friction washers 13 and 14 surrounding the pivot in proximity to this shoulder and are fastened to the pivot in any desired manner, as by the key 8d. One of the washers engages the shoulder and another engages the friction portion 12b, see Fig. 6. One set of washers is preferably made of non-metallic friction material, such as the washers 14. A spring 15 surrounds the ends of the pivot, the pivot being threaded at one end and there is a nut 8b engaging these threads, which when tightened compresses the spring and forces the friction washers tightly against the shoulder and the friction portion 12b and each other, so that friction is produced which resists the turning of either the window glass or the window frame and which holds either of these parts in any angular position to which they may be moved. The nut 8b may be held in its tightly pressed position by the pin 8c.

It will be seen that by means of this construction the glass and the frame or either of them, when pivotally moved, move about an axis extending longitudinally of the automobile and that they will remain in any angular position to which they are moved. I may make either one or both of the pivots friction pivots.

Some suitable locking means is provided for locking the window glass and the frame in their closed positions. As herein shown, there is a locking member 18 which is provided with a suitable handle and which is mounted upon a pivot 18c connected with the frame member 4 and is provided with locking part 18a which engages a cooperative locking part 18b attached to the frame 6. The locking device for the frame 6 consists of a locking member 19 mounted upon a pivot 19c connected with the frame 6, the locking member being provided with a locking part 19a which engages a cooperative locking part 19b on the window frame. The locking device 18 releasably locks the glass section 3 in its closed position and to the frame 6 and the locking device 19 releasably locks the frame 6 in its closed position and to the window frame. When both the locking devices are in their locking position, the window and the frame are both locked in a closed position. These locking devices are on the inside of the automobile.

With this construction the parts may be moved to various positions as desired. For example, the frame 6 and the glass 3 may be moved together by moving them about the pivots 8 of the frame. This movement, for example, is illustrated in Fig. 4 where the upper end of the frame and the glass is moved outwardly and the inner end inwardly. The glass itself may be moved separately from the frame by moving it about its pivots and this is illustrated in Fig. 5, where the glass is moved inwardly at the top and outwardly at the bottom. It will be seen that when the glass is in this position, air may enter the automobile, but rain cannot enter as it will strike the glass and be deflected outwardly so that it cannot come within the automobile. It will be noted that in this construction the glass 3 may be moved to a position where its upper end projects out of the automobile or in a position where its upper end projects into the automobile. It will be seen that by means of this construction, the window can be opened any desired amount without projecting an objectionable distance into or outside of the automobile and that it may also be opened to secure proper ventilation without permitting rain to enter.

I claim:

1. A ventilating device for automobiles having a body with a window opening therein, comprising a window frame pivotally mounted in said window opening on an axis extending longitudinally of the automobile body, a window glass pivotally mounted in said window frame on an axis extending longitudinally of the automobile body, both the window frame and the window glass being mounted upon the same pivots, and releasable locking means for releasably locking the frame to the automobile body and for releasably locking the window glass to the window frame in all the various angular positions of the window frame, whereby the window frame and the glass may be moved together to an angular position or the window glass may be moved separately from the frame to an angular position.

2. A ventilating device for automobiles having a body with a window opening therein, comprising a window frame pivotally mounted in said window opening on an axis extending longitudinally of the automobile body, a window glass pivotally mounted in said window frame on an axis extending longitudinally of the automobile body, both the window frame and the window glass being mounted upon the same pivots, and releasable locking means for releasably locking the window glass in the window frame while the window frame is in all its various angular positions, whereby the window frame and the glass may be moved together to an angular position or the window glass may be moved separately from the frame to an angular position.

3. A ventilating device for automobiles having a body with a window opening therein, comprising a window frame pivotally mounted in said window opening on an axis extending longitudinally of the automobile body, a window glass pivotally mounted in said wondow frame on an axis extending longitudinally of the automobile body the window frame projecting in all directions beyond the window glass, and two sealing devices, one on the outer edge of the frame and the other on the inner edge of the frame, the window frame and the window glass being mounted upon the same pivots, whereby the window frame and the glass may be moved together to project the upper edge of the glass to the outside of the automobile and the lower edge of the glass to the inside of the automobile.

4. A ventilating device for automobiles having a body with a window opening therein, comprising a frame pivoted in the window opening, and a window glass pivoted in the frame, the frame and the window glass being mounted upon the same pivots, the glass and the frame movable to ventilating position separately or together, the same pivots when the glass is moved separate from the frame, acting to support the frame in a stationary position and also acting as pivots about which the glass moves.

WILLARD L. MORRISON.